(12) United States Patent
Olaru

(10) Patent No.: US 7,410,354 B2
(45) Date of Patent: *Aug. 12, 2008

(54) VALVE GATED NOZZLE HAVING A VALVE PIN WITH A SENSOR

(75) Inventor: George Olaru, North York (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/615,620

(22) Filed: Dec. 22, 2006

(65) Prior Publication Data

US 2007/0104823 A1 May 10, 2007

Related U.S. Application Data

(63) Continuation of application No. 10/809,707, filed on Mar. 26, 2004, now Pat. No. 7,182,893, which is a continuation-in-part of application No. 10/268,885, filed on Oct. 11, 2002, now Pat. No. 6,739,863.

(60) Provisional application No. 60/328,404, filed on Oct. 12, 2001.

(51) Int. Cl.
*B29C 45/23* (2006.01)

(52) U.S. Cl. ........................ 425/564; 425/572

(58) Field of Classification Search ............... 425/572, 425/564
See application file for complete search history.

(56) References Cited

U.S. PATENT DOCUMENTS

| | | | |
|---|---|---|---|
| 2,246,095 A | 6/1941 | Graves | |
| 3,807,914 A | 4/1974 | Paulson et al. | |
| 4,222,733 A | 9/1980 | Gellert et al. | |
| 4,276,015 A | 6/1981 | Rogers | |
| 4,330,258 A | 5/1982 | Gellert | |
| 4,521,179 A | 6/1985 | Gellert | |
| 4,611,394 A | 9/1986 | Gellert | |
| 4,663,811 A | 5/1987 | Gellert | |
| 4,705,473 A | 11/1987 | Schmidt | |
| 4,711,625 A | 12/1987 | Knauer et al. | |

(Continued)

FOREIGN PATENT DOCUMENTS

CA 2331576 11/1999

(Continued)

OTHER PUBLICATIONS

Akar, et al., "A Wireless Batch Sealed Absolute Capacitive Pressure Sensor", *Sensors and Actuators*, Elsevier Science B.V.,(2001),p. 29-38.

(Continued)

*Primary Examiner*—Tim Heitbrink
(74) *Attorney, Agent, or Firm*—Medler Ferro PLLC

(57) ABSTRACT

An injection molding apparatus includes a manifold for delivering a melt stream of moldable material to a nozzle melt channel of a nozzle. A valve pin extends through the nozzle melt channel and is axially movable to selectively open a gate to allow communication with a mold cavity. A sensor is coupled to a forward end of the valve pin. The sensor may be a pressure sensor and/or temperature sensor in direct contact with the melt stream to provide pressure and/or temperature information to a controller.

25 Claims, 9 Drawing Sheets

U.S. PATENT DOCUMENTS

| | | | |
|---|---|---|---|
| 4,820,147 | A | 4/1989 | Gellert |
| 5,049,062 | A | 9/1991 | Gellert |
| 5,106,291 | A | 4/1992 | Gellert |
| 5,118,279 | A | 6/1992 | Gellert |
| 5,136,141 | A | 8/1992 | Trakas |
| 5,223,275 | A * | 6/1993 | Gellert ............... 425/572 |
| 5,225,211 | A | 7/1993 | Imaida et al. |
| 5,238,391 | A | 8/1993 | Teng |
| 5,284,436 | A | 2/1994 | Gellert |
| 5,334,008 | A | 8/1994 | Gellert |
| 5,346,388 | A | 9/1994 | Gellert |
| 5,387,099 | A | 2/1995 | Gellert |
| 5,472,331 | A | 12/1995 | Watkins |
| 5,665,283 | A | 9/1997 | Bader |
| 5,695,793 | A | 12/1997 | Bauer |
| 5,795,599 | A | 8/1998 | Gellert |
| 5,993,704 | A | 11/1999 | Bader |
| 6,090,318 | A | 7/2000 | Bader |
| 6,294,122 | B1 | 9/2001 | Moss |
| 6,305,923 | B1 | 10/2001 | Godwin et al. |
| 6,464,909 | B1 | 10/2002 | Kazmer |
| 6,585,505 | B2 | 7/2003 | Kazmer |
| 6,638,050 | B2 | 10/2003 | Bazzo |
| 6,649,095 | B2 | 11/2003 | Buja |
| 6,739,863 | B2 | 5/2004 | Olaru |
| 6,746,231 | B1 | 6/2004 | Benenati |
| 6,764,297 | B2 | 7/2004 | Godwin et al. |
| 7,182,893 | B2 * | 2/2007 | Olaru ............... 425/564 |
| 2002/0182285 | A1 | 12/2002 | Godwin et al. |
| 2003/0072833 | A1 | 4/2003 | Olaru |
| 2004/0113303 | A1 | 6/2004 | Frey |
| 2004/0135277 | A1 | 7/2004 | Frey |
| 2004/0185142 | A1 | 9/2004 | Olaru |

FOREIGN PATENT DOCUMENTS

| | | |
|---|---|---|
| EP | 0963829 | 12/1999 |
| EP | 0967063 | 12/1999 |
| EP | 1277560 | 1/2003 |
| IT | 1268050 | 2/1997 |
| JP | 04138134 A | 5/1992 |
| JP | 04138234 A | 5/1992 |
| JP | 05024077 | 2/1993 |
| JP | 6-339951 | 12/1994 |
| JP | 6-339951 A | 12/1994 |
| JP | 8244086 | 9/1996 |
| JP | 2001088169 | 4/2001 |
| WO | WO-98/19846 | 5/1998 |
| WO | WO-99/59795 | 11/1999 |
| WO | WO-01/03905 | 1/2001 |
| WO | WO-02/081177 | 10/2002 |
| WO | WO-03/031146 A1 | 4/2003 |
| WO | WO-2006/027173 | 3/2006 |

OTHER PUBLICATIONS

Bicking, Robert E., "Fundamentals of Pressure Sensor Technology", http://www.sensormag.com/articles/1198/fun1198/fun1198_2.shtml,(Nov. 1998).

Kazmer, et al., "Wireless Pressure Sensor for Injection Molding", *Society of Plastics Engineers Annual Technical Conference*, Sensors and Monitoring Special Interest Group,Nashville,Tenn.,(2003).

Kistler, "New Technologies Secure a Competitive Edge", *Plastic News*, (Feb. 2003),p. 1-4.

Kistler Japan Co.,Ltd, "Sensors and Data Acquisition For Injection Molding Cavity Pressure and Temperature Sensor and Dataflow", *Testing and Measuring Instruments*, Booth No. 6D-02.

Nunnery, Len , "Tooling Innovations for Thermoset Molding", *Bulk Molding Compounds, Inc*, http://www.bulkmolding.com/technical-papers/technical_papers/tooling_thermosetmolding.pdf,(Sep. 2001).

Priamus System Technologies AG, "System Description, Priamus Fill' Type 7001A", *PST*, SD001eEd.11.01, Schaffhausen/Switzerland,p. 1-4.

Sloan, Jeff , "In-runner, pressure-governed value system gives molders pinpoint, fast feed control", *Injection Molding Magazine*, (Jul. 1998),p. 13-18.

Zhang, et al., "A Self-Energized Sensor for Wireless Injection Mold Cavity Pressure Measurement: Design and Evaluation", *ASME Journal of Dynamic Systems*.

Zhang, et al., "Development of a Wireless Pressure Sensor with Remote Acoustic Transmission", *Journal of the North American Manufacturing Research Institute*, (2002),p. 573-580.

"Pressure and Temperature Control of Multicavity Injection Mold with Hydraulic Valve Gate Hot Mold System", Research Disclosure No. 301, Emsworth GB, May 1989, p. 333.

* cited by examiner

VALVE GATED NOZZLE HAVING A VALVE PIN WITH A SENSOR

CROSS-REFERENCE TO RELATED APPLICATIONS

This application is a continuation of U.S. application Ser. No. 10/809,707, filed Mar. 26, 2004, now U.S. Pat. No. 7,182,893, which is a continuation-in-part of U.S. application Ser. No. 10/268,885 filed Oct. 11, 2002, now U.S. Pat. No. 6,739,863 B2, issued May 25, 2004 which claims the benefit of U.S. Appl. No. 60/328,404, filed Oct. 12, 2001, abandoned. Each of these applications is incorporated by reference herein in its entirety.

FIELD OF THE INVENTION

The present invention relates generally to an injection molding apparatus having at least one nozzle with a valve pin.

BACKGROUND OF THE INVENTION

In an injection molding apparatus, the molding conditions of each of a plurality of mold cavities must be as close as possible to predetermined ideal molding conditions in order to ensure that high quality molded parts are produced. Any significant variation in the temperature and/or pressure of one or more mold cavities may result in the production of substandard molded parts.

Pressure and/or temperature sensors are used in injection molding apparatus to determine molding conditions of each of a plurality of mold cavities. It is known to position a pressure and/or temperature sensor along a nozzle melt channel, a manifold melt channel, and/or within a mold cavity to measure a processing condition at that respective location of the injection molding apparatus. In a valve gated injection molding system, it is known to position a pressure measurement device upstream of a valve pin such that it will measure pressure when a rear end of the valve pin is in direct or indirect contact therewith when the valve pin is in a retracted position.

SUMMARY OF THE INVENTION

Embodiments of the present invention are directed to an injection molding apparatus having at least one manifold for receiving a melt stream of moldable material and delivering the melt stream to at least one nozzle that is in fluid communication with a mold cavity. The injection molding apparatus includes at least one valve pin that is axially movable within a melt channel thereof for controlling melt flow with respect to the mold cavity. In the present invention, at least one sensor is coupled to a forward end of the valve pin such that the sensor measures a processing condition of the melt stream.

In another embodiment of the present invention, there is provided an injection molding apparatus having a first melt channel for receiving a first melt material from a first melt source and having a second melt channel for receiving a second melt material from a second melt source. A valve pin extends through the first melt channel of the nozzle and is axially movable for controlling the flow of the first and second melt materials, wherein the valve pin includes a sensor for detecting at least one processing condition of the first and/or second melt materials coupled thereto. A mold cavity is in fluid communication with the nozzle via a respective mold gate and the valve pin has an end portion for selectively opening and closing the mold gate.

BRIEF DESCRIPTION OF THE FIGURES

Embodiments of the present invention will now be described more fully with reference to the accompanying drawings in which like reference numerals indicate similar structure.

DETAILED DESCRIPTION OF THE INVENTION

Figure 1:
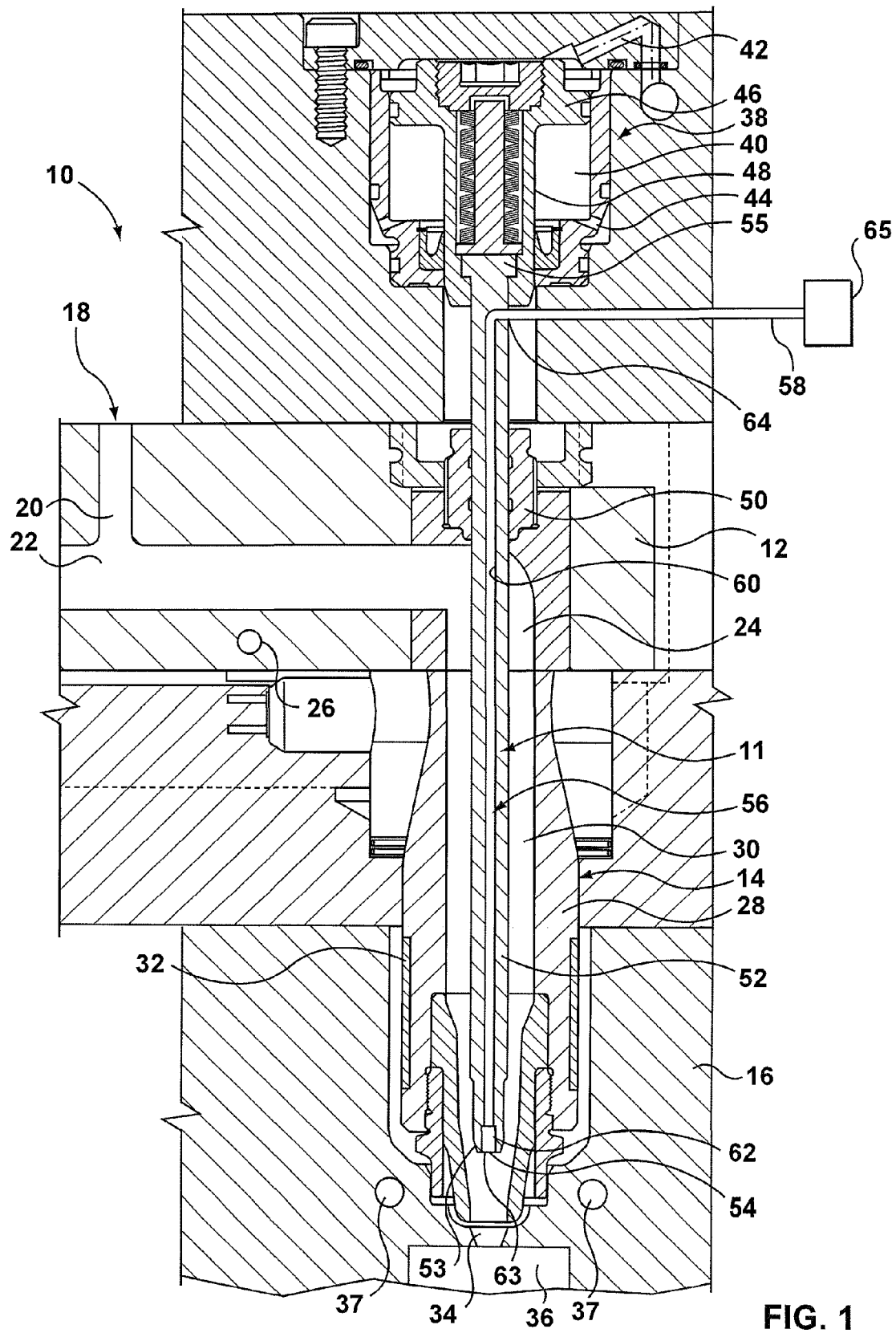
FIG. 1 is a side sectional view of a portion of an injection molding apparatus according to an embodiment of the present invention, the injection molding apparatus including a valve-gated nozzle with a valve pin in an open position.
Figure 2:
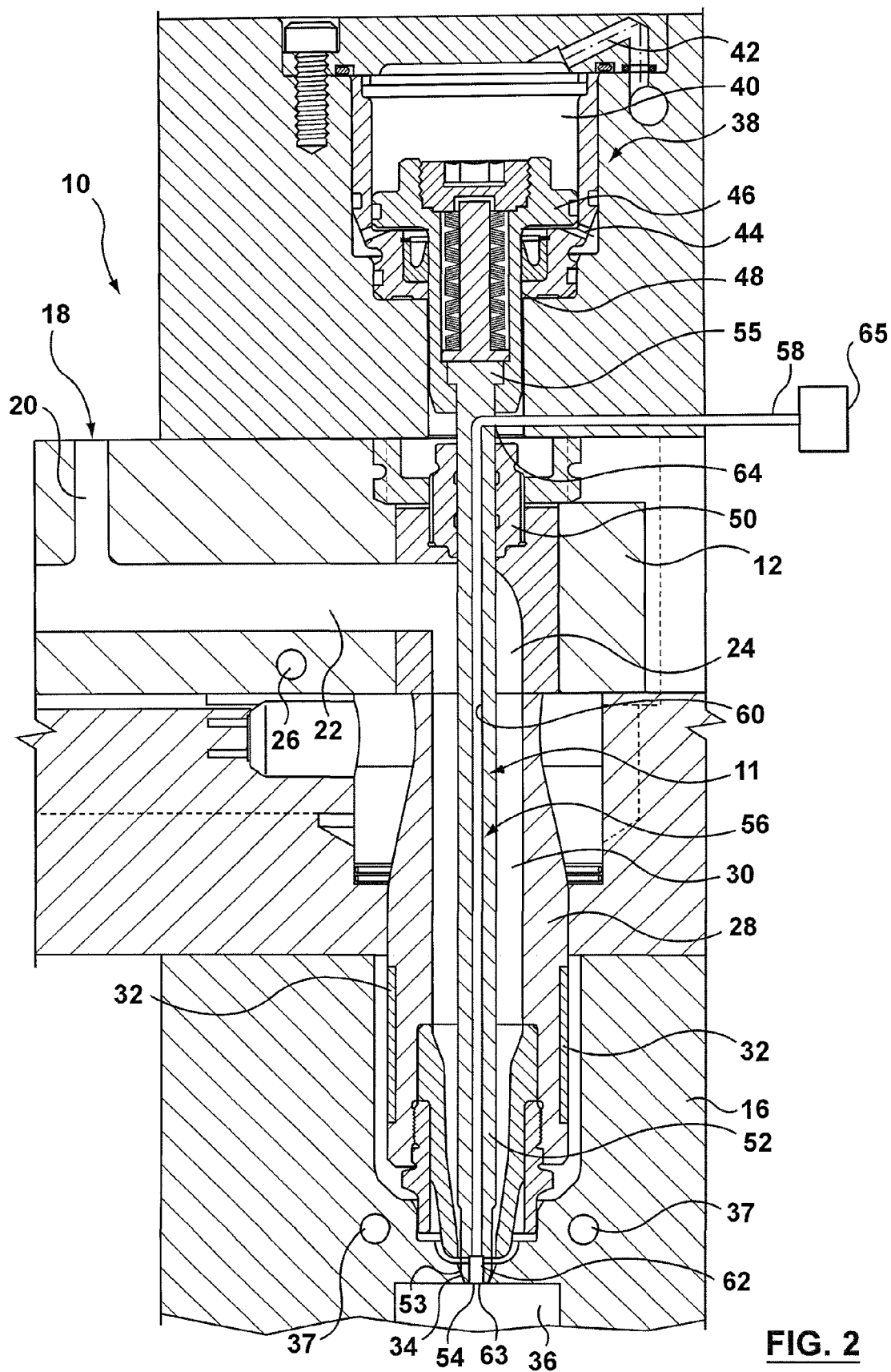
FIG. 2 is a side sectional view similar to FIG. 1 with the valve pin in a closed position.

Referring now to FIGS. 1 and 2, an injection molding apparatus 10 is generally shown. The injection molding apparatus 10 includes a manifold 12, a plurality of nozzles 14 and a mold cavity block 16. The manifold 12 includes an inlet 18 for receiving a melt stream of moldable material from a machine nozzle (not shown). The melt stream flows from the inlet 18, through an inlet channel 20 and plurality of intermediate melt channels 22 to a plurality of outgoing melt channels 24, which are located downstream of the intermediate melt channels 22. The manifold block 12 is heated by a heater 26, which may be any suitable type of manifold heater known in the art.

The nozzles 14 are positioned downstream of the outgoing melt channels 24 of the manifold 12. Each nozzle 14 includes a nozzle body 28 having a nozzle melt channel 30 extending there through. The nozzle melt channel 30 receives melt from the outgoing melt channel 24 of the manifold 12. The nozzle 14 is heated by a nozzle heater 32, which may be mounted to the nozzle 14 in any way known in the art. For example, nozzle heater 32 may surround the exterior of the nozzle body 28, as shown in FIG. 1, or alternatively, nozzle heater 32 may be embedded within the nozzle body 28.

The nozzle melt channel 30 ends at a gate 34, which is the entrance from the nozzle melt channel 30 into a mold cavity 36 in the mold cavity block 16. Melt passes from the nozzle melt channel 30 past gate 34 and into mold cavity 36. Mold cavity block 16 is cooled by a coolant, which flows through cooling channels 37.

A valve pin 11 is located within each nozzle melt channels 30 to control the flow of melt into a respective mold cavity 36. Each valve pin 11 reciprocates within the nozzle melt channel 30 to selectively open and close the gate 34.

The valve pin 11 is actuated by an actuator 38. Actuator 38 may be any suitable type of actuator. For example, actuator 38 may include a chamber 40, having a first fluid passage 42 proximate one end of the chamber 40, a second fluid passage 44 proximate the opposing end of the chamber 40, a piston 46 in the chamber 40 and an arm 48 extending from the piston 46 to outside the chamber 40. The arm 48 may connect the piston 46 inside the chamber 40 to the valve pin 11, using any suitable connection means. For several reasons including ease of cleanout, the arm 48 preferably connects to the valve pin 11 outside of any melt channels 22 and 30, so that the melt is not permitted to seep into the connection. The arm 48 may be fixedly connected to the piston 46. A fluid, such as a hydraulic oil or air, for example, may be introduced into the chamber 40 on one side of the piston 46 at a selected pressure and/or removed on the opposing side of the piston 46 to move the piston 46, (and in turn, the arm 48 and the valve pin 11), in a direction either towards or away from the gate 34. The movement of the valve pin 11 towards and away from the gate 34 controls the melt flow into the mold cavity 36.

The valve pin 11 extends through a mold plug 50 into the outgoing melt channel 24 and nozzle melt channel 30. Mold plug 50 seals around valve pin 11 to inhibit melt from escaping from outgoing melt channel 24. The mold plug 50 acts as a bearing to permit sliding of the valve pin 11 there through, so that valve pin 11 can move, as desired in melt channels 24 and 30. In the position shown in FIG. 1, valve pin 11 is in the open position to permit melt flow into mold cavity 36.

Valve pin 11 includes a valve pin body 52, which has an end portion 53 having an end surface 54. The end portion 53 of the valve pin 11 may be tapered, as shown in FIGS. 1 and 2, or alternatively, may have any suitable shape, such as cylindrical. The end portion 53 is generally used for gating purposes, i.e. for the closing of the gate 34 and is therefore shaped to mate with the gate 34. In the position shown in FIG. 2, the valve pin 11 is in the closed position, with the end portion 53 being positioned in the gate 34, to prevent melt flow into mold cavity 36.

Valve pin 11 further includes a head 55. The head 55 is used to facilitate connecting the valve pin 11 to the piston 46. The head 55 is positioned at the upstream end of the valve pin 11. The head 55 is generally a disc-shaped portion that has a larger diameter than that of the valve pin body 52. The head 55 may be captured by any suitable means known in the art, so that the valve pin 11 is removable from the arm 48.

A pressure sensor 56 is provided in an internal passage 60 of the valve pin 11. The pressure sensor 56 includes a connector 58, which links a sensing piece 62 of the pressure sensor 56 to a controller 65 for receiving, processing, transmitting and/or recording the measurements from pressure sensor 56. The connector 58 may be a single wire or multiple wires depending on the type of pressure sensor 56 that is used. Any suitable type of pressure sensor capable of sensing pressures between 100 and 3000 bar may be used. For example, pressure measuring sensor no. 6183A, which is produced by Kistler Instrument Corp. of Amherst, N.Y., may be suitable.

The sensing piece 62 of the pressure sensor 56 is positioned so that a downstream or melt contacting surface 63 of the sensing piece 62 is flush with the end surface 54 of the valve pin 11. This allows the pressure sensor 56 to be in direct contact with the melt stream so that the pressure of the melt may be obtained when the valve pin 11 is in any position.

The connector 58 of the pressure sensor 56 exits the valve pin body 52 at an exit point 64, which is outside of the nozzle melt channel 30 and manifold outgoing melt channel 24. Exit point 64 may be at any suitable position on valve pin 11, such as, for example, on the side of the valve pin body 52, as shown. The position of exit point 64 should be such that the connector 58 does not interfere with the movement of valve pin 11 in melt channels 24 and 30. The connector 58 should be long enough between the valve pin 11 and the controller 65, so that it does not interfere with the movement of the valve pin 11.

The pressure sensor 56 allows for continuous measurement of the melt stream. When the valve pin 11 is in the retracted position of FIG. 1, the pressure sensor 56 measures the pressure of the melt in the nozzle melt channel 30. When the valve pin 11 is in the extended position of FIG. 2, in which the end portion 53 of the valve pin 11 engages the gate 34, the pressure sensor measures the pressure of the melt in the mold cavity 36.

Each valve pin 11 in the injection molding apparatus 10 is equipped with pressure sensor 56 so that the pressure in each of the plurality of nozzle melt channels 30 and respective mold cavities 36 may be measured and compared with other nozzle melt channels 30 and mold cavities 36 in the injection molding apparatus 10.

In one embodiment, the controller 65 may operate to provide feedback to adjust the amount of packing performed by the valve pin 11 following injection. The controller 65 would direct the valve pin 11 to pack more or less depending on the pressure in the mold cavity 36. In one embodiment, this arrangement may be used with an electrical actuator so that packing is effectively controlled as would be apparent to one of ordinary skill in the art.

Because the pressure measured by the pressure sensor 56 is an indication of the viscosity of the melt, the controller 65 may further be configured to communicate with the nozzle heater 32 in order to adjust the temperature of the melt in the nozzle melt channel 30. Adjusting the melt temperature changes the melt viscosity and therefore may be used to set the pressure to a desired pressure.

Figure 3:
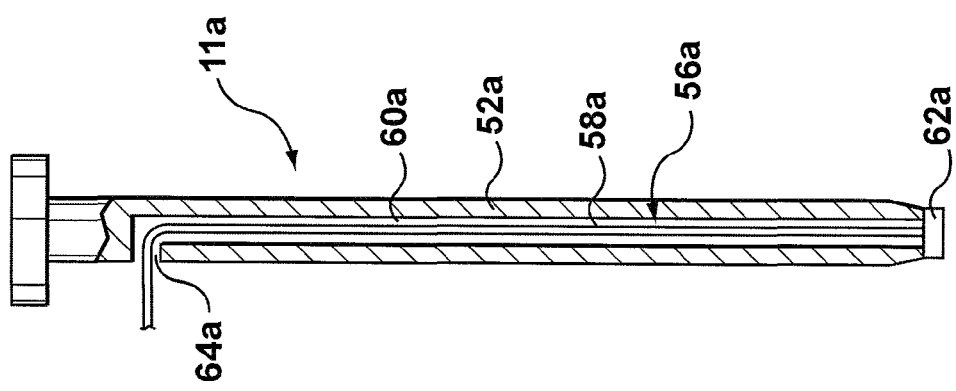
FIG. 3 is a side view partly in section of a valve pin according to an embodiment of the present invention.

Referring to FIG. 3, another embodiment of the present invention is shown. In this embodiment, a valve pin 11a includes a sensing piece 62a of a pressure sensor 56a that is located downstream of an end of valve pin 11a and is external thereto. A suitable material is used to fill any air gap between the sensing piece 62 and the valve pin 11a, so that the valve pin 11a maintains a smooth outer surface.

Figure 4B:
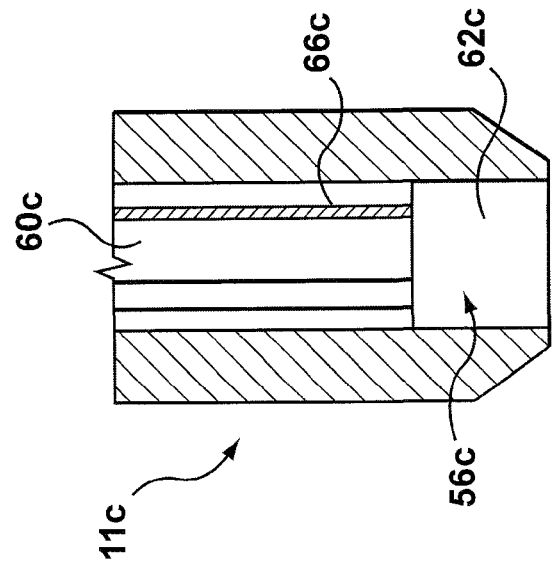
FIGS. 4A-4B are side sectional views of a downstream portion of a valve pin according to various embodiments of the present invention.
Figure 4A:
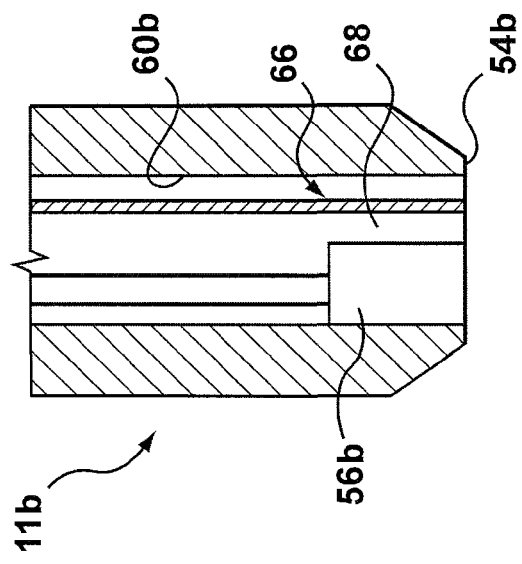

Referring to FIG. 4A, another embodiment of a valve pin 11b is shown. Valve pin 11b is similar to valve pin 11 of FIGS. 1 and 2; however, in addition to pressure sensor 56b, valve pin 11b includes a thermocouple 66. The thermocouple 66 extends through an internal passage 60b and is coupled to a controller (not shown) in a similar manner as the pressure sensor 56b. Conductive fill 68 is provided around the pressure sensor 56b and the thermocouple 66 to be a continuous surface with nozzle end surface 54b. Thermocouple 66 may be any suitable type of thermocouple capable of sensing temperatures in the range of at least 100° C. to 400° C.

FIG. 4B, shows another embodiment of a valve pin 11c. Valve pin 11c is similar to valve pin 11b of FIG. 4A; however, sensing piece 62c of the pressure sensor 56c fills the entire downstream end of internal passage 60c. As such, thermocouple 66c is spaced from an end surface 54c of the valve pin 11c and extends only to an upstream end of the sensing piece 62c.

Figure 5:
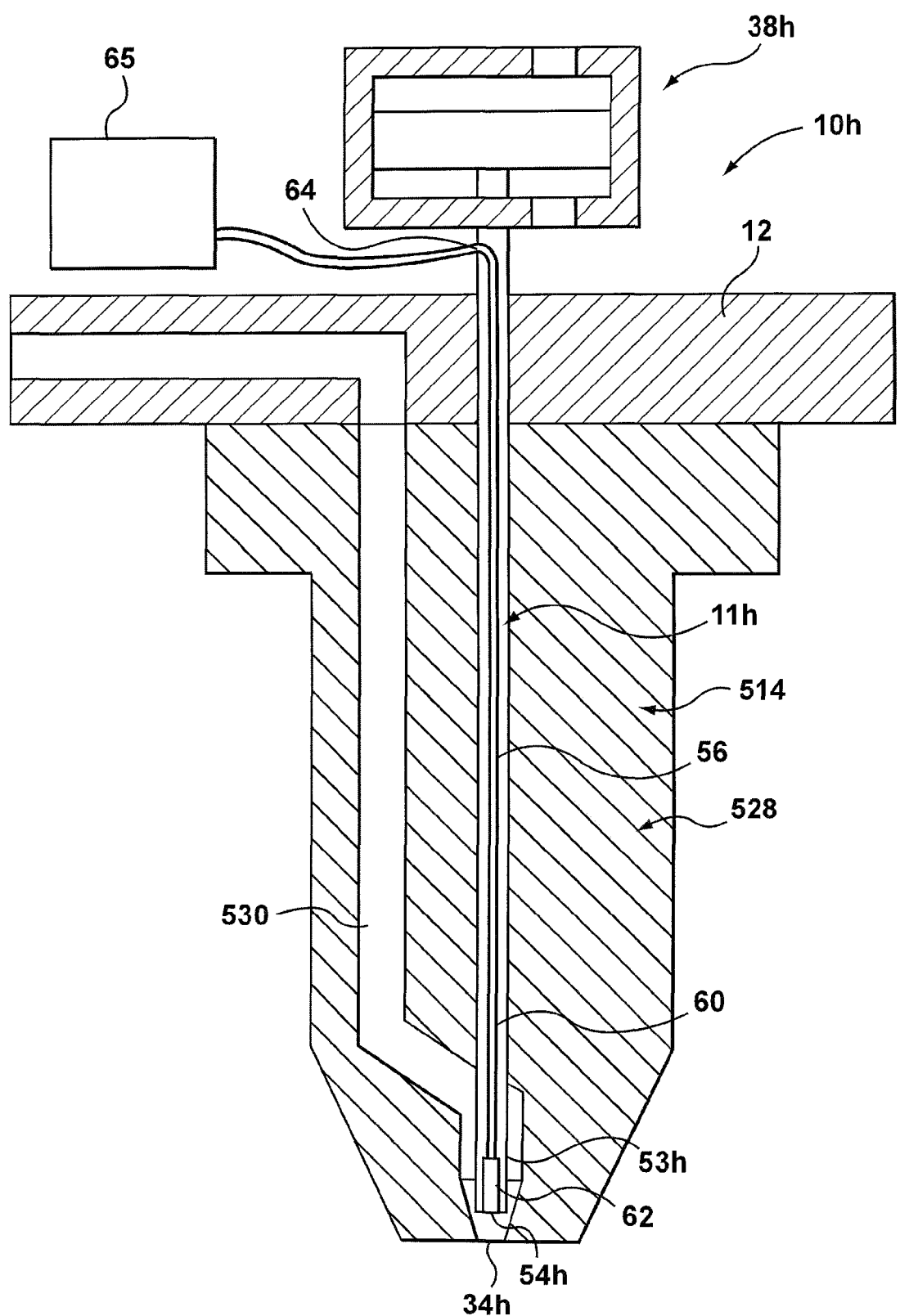
FIG. 5 is a side sectional view of an injection molding apparatus according to another embodiment of the present invention.

Reference is made to FIG. 5, which shows an injection molding apparatus 10h in which valve pin 11h is used with a nozzle 514. Valve pin 11h is similar to valve pin 11 of FIGS. 1 and 2, however, an end portion 53h does not taper towards end surface 54h. Nozzle 514 is similar to nozzle 14, except that nozzle 514 includes a nozzle body 528 with an offset nozzle melt channel 530. Valve pin 11h passes through manifold 12, through nozzle body 528 and into nozzle melt channel 530. Valve pin 11h is actuated by actuator 38h to open and close a valve gate 34h.

Figure 6:
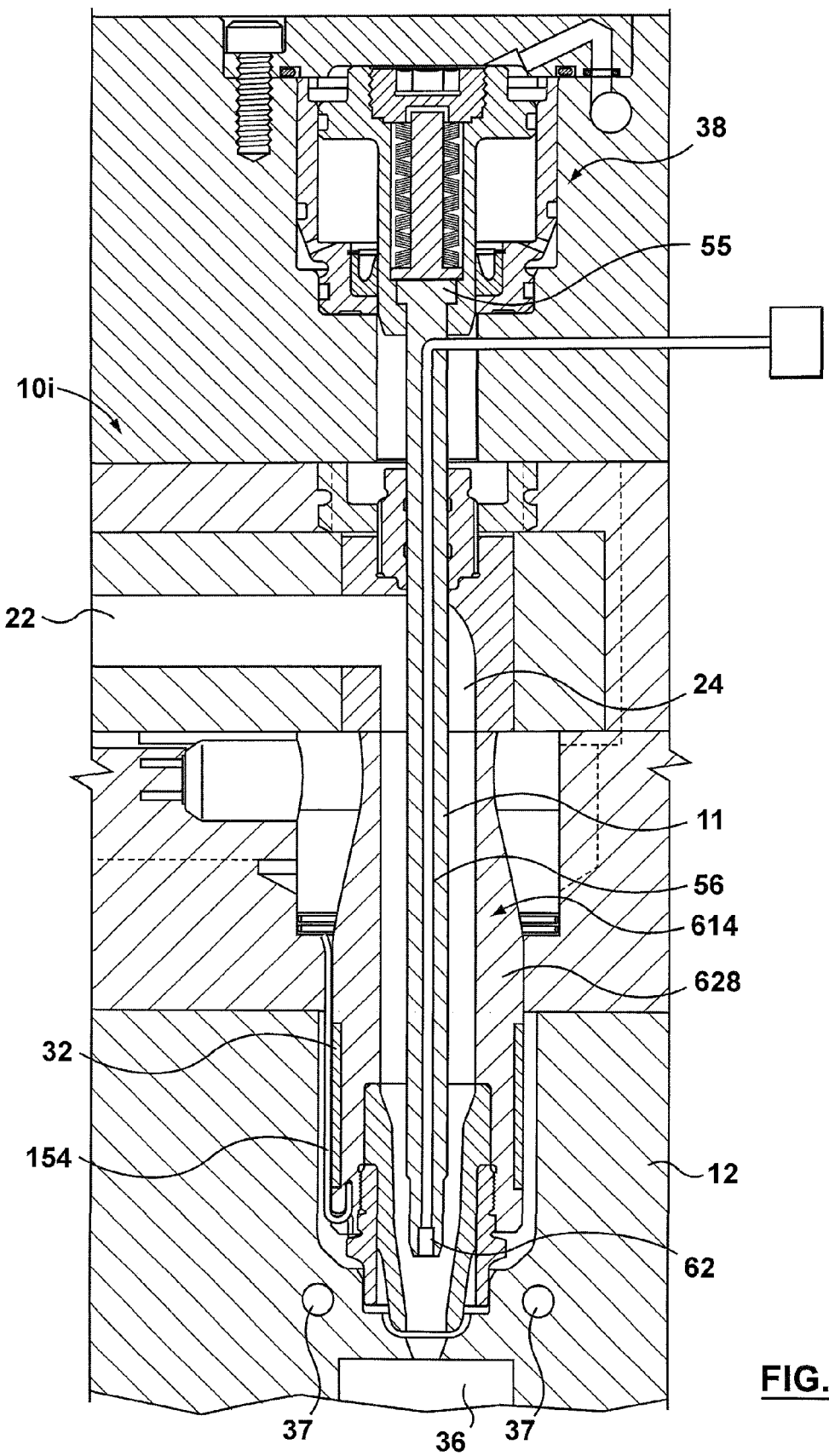
FIG. 6 is a side sectional view of a portion of an injection molding apparatus according to another embodiment of the present invention, the injection molding apparatus including a valve-gated nozzle with a valve pin in an open position.

Reference is made to FIG. 6, which shows another embodiment of an injection molding apparatus 10i. This embodiment includes a nozzle 614, which is similar to nozzle 14, except that nozzle 614 includes a body 628 having a thermocouple 154 coupled thereto. Thermocouple 154 may be used to measure the temperature of some portion of the nozzle 614. For example, the thermocouple 154 may be used to measure the temperature of the nozzle body 628 or the temperature of the nozzle heater 32.

Figure 7:
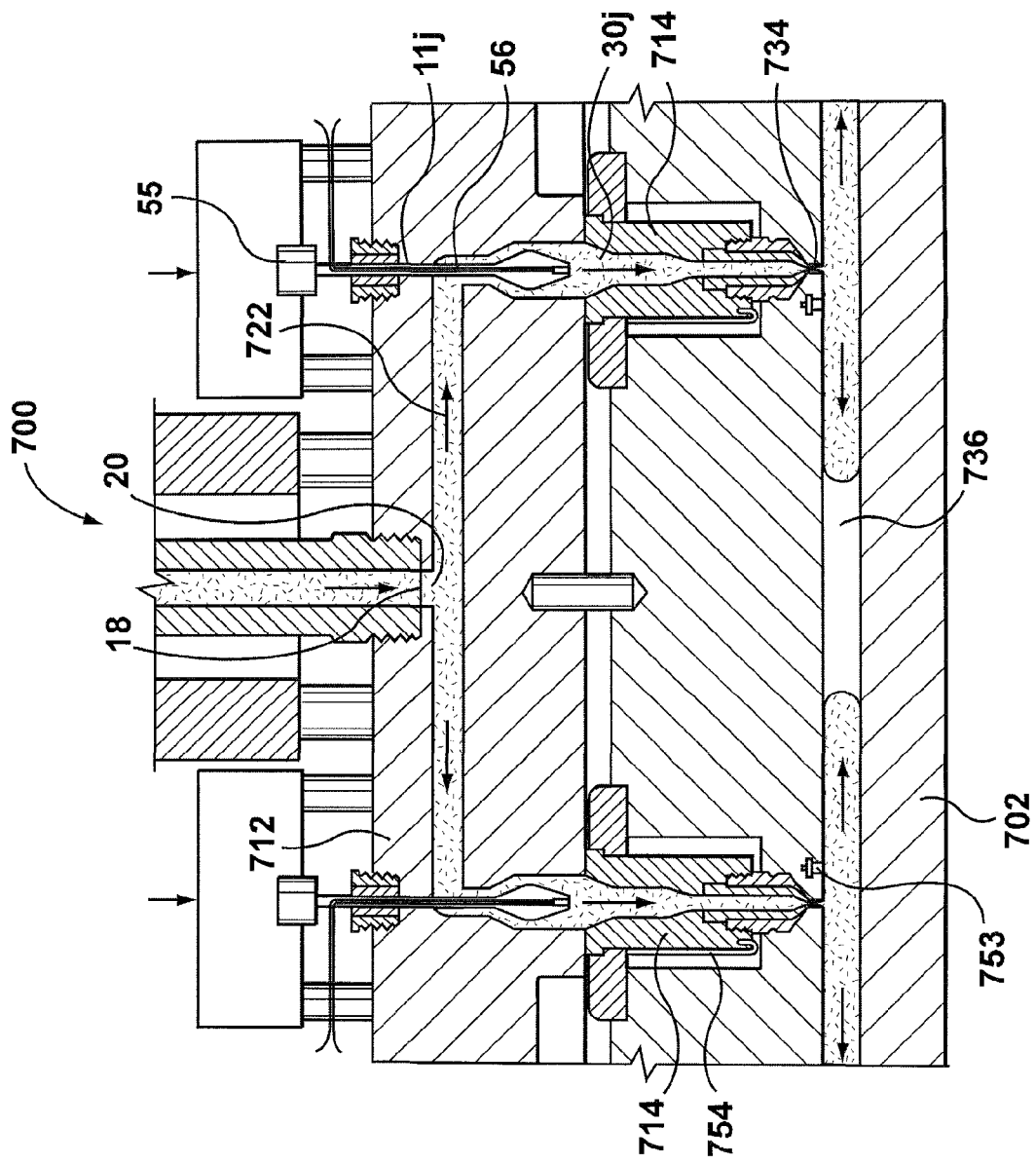
FIG. 7 is a side sectional view of a portion of a multigate injection molding apparatus according to another embodiment of the present invention.

Reference is made to FIG. 7, which shows a multi-gate injection molding apparatus 700. Molding apparatus 700 includes a mold cavity plate 702 with a plurality of mold cavities 704. Each mold cavity 704 includes a plurality of gates 734 permitting entry of melt into mold cavity 736 from a plurality of points. Molding apparatus 700 further includes manifold 712, and a plurality of nozzles 714, whereby more than one nozzle 714 may feed melt to a single mold cavity 736. Valve pins 11j may be included in molding apparatus 700, to provide melt pressure information from each nozzle 714 leading to a mold cavity 736.

FIG. 7 discloses another embodiment of the current invention in which pressure sensor 56 is embedded in a movable valve pin 11j that controls the flow of the molten material through melt channel 722 of manifold 712. FIG. 7 shows two nozzles 714 feeding a single mold cavity 736 via two separate mold gates 734 in a simultaneous, sequential or dynamic feed injection molding manner. These methods require that the flow of molten material into the mold cavity be controlled through valve pins 11j located in the manifold melt channel in order to control the location of any knit lines that may occur in the mold cavity when two or more streams of melt delivered by separate nozzles 714 meet.

Unlike previous known designs where additional holes are bored into a manifold to place a pressure sensor in contact with a pressurized melt, the embodiment of FIG. 7 illustrates an apparatus wherein no additional manufacturing steps are required on the manifold to enable pressure sensor 56 to be located in direct contact with the melt flowing through manifold melt channel 722. This is achieved by embedding or attaching pressure sensor 56 to the movable valve pin 11j. As such, the necessity of additional holes being needed in the manifold for pressure sensors is eliminated, holes which can be vulnerable to melt leakage and which are also difficult to manufacture.

In addition to the foregoing advantage, the embodiment of FIG. 7 provides a movable pressure sensor that allows the measurement of the melt pressure in the manifold at various positions along the melt channel. In another embodiment related to FIG. 7, an additional temperature sensor (not shown) may be attached to valve pin 11j to measure the temperature of the melt flowing through the manifold melt channel. This temperature sensor may be a thermocouple or any other known temperature measuring device. Such an arrangement allows for the simultaneous measurement of the pressure and temperature of the melt flowing through the manifold melt channel at more than one location. In one embodiment, the pressure and the temperature sensors are connected to a controller (not shown) that uses this information to provide positioning data to each actuator that moves valve pins 11j in the manifold channel. These actuators can be fluidly, mechanically or electrically driven.

FIG. 7 also illustrates pressure and temperature sensors, i.e., pressure sensor 753 and thermocouple 754, located adjacent to the mold cavity to measure these parameters in the cavity.

Figure 8A:
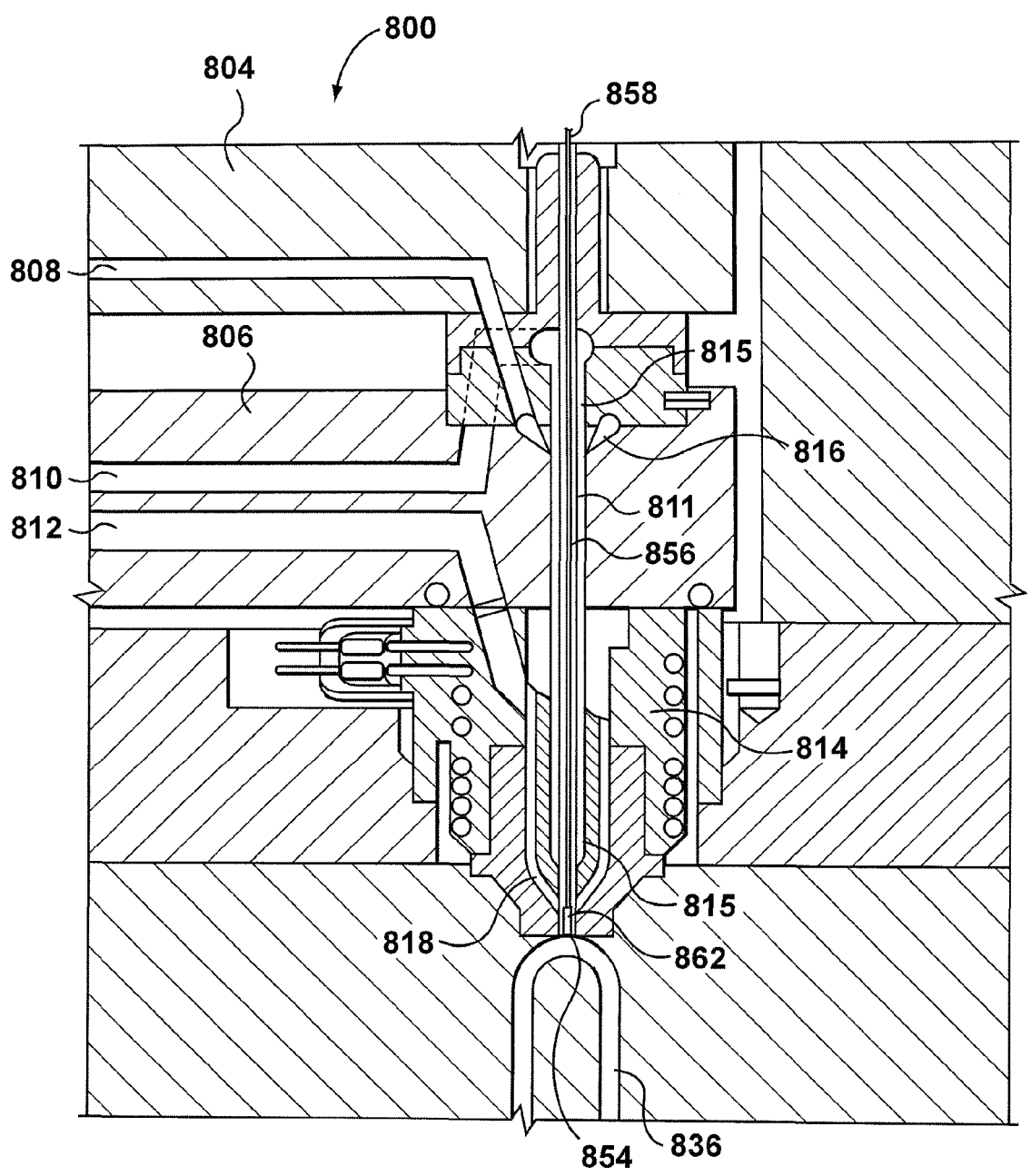
FIGS. 8A, 8B and 8C are side sectional views of a portion of a co-injection molding apparatus according to another embodiment of the present invention.
Figure 8B:
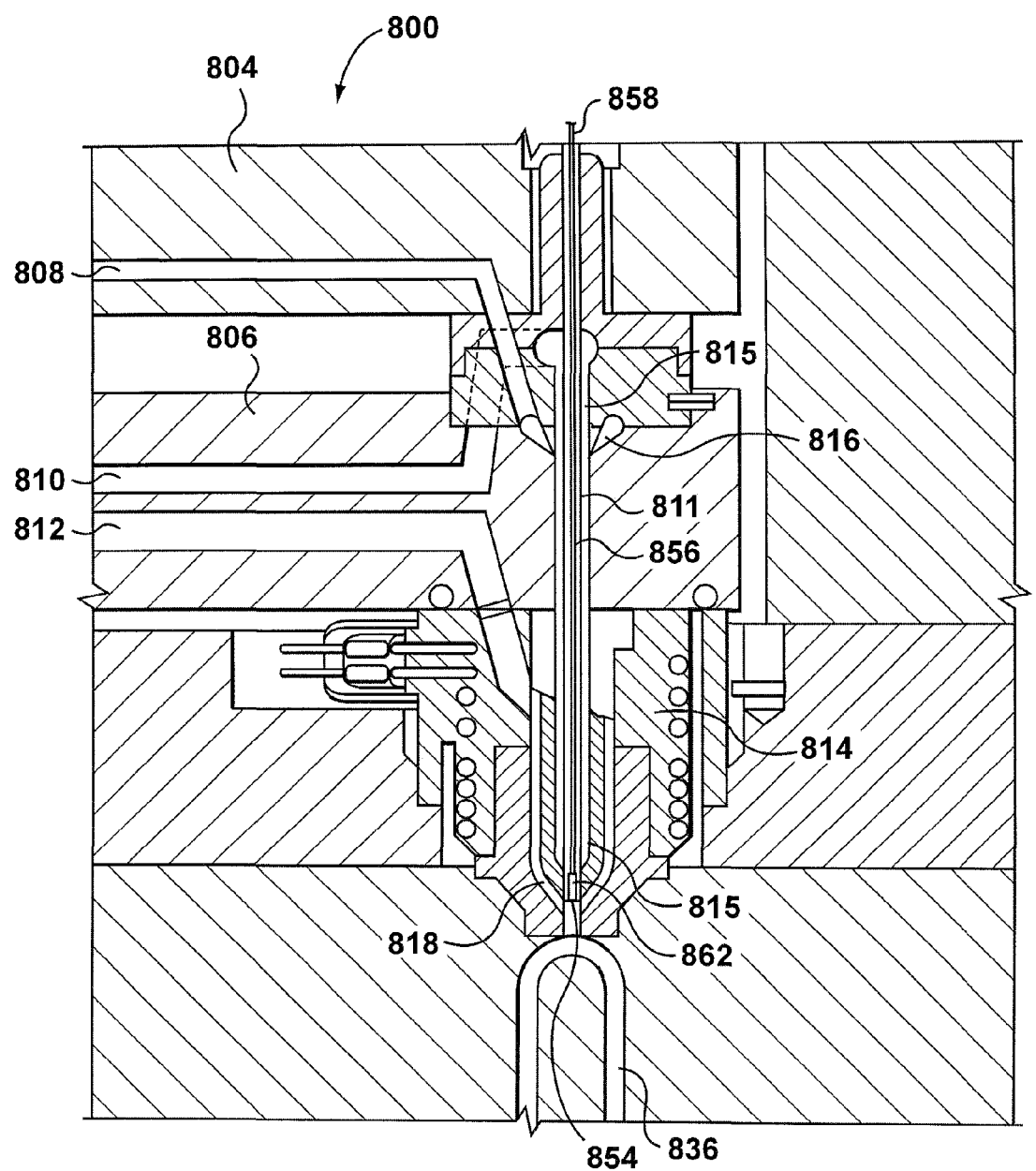
Figure 8C:
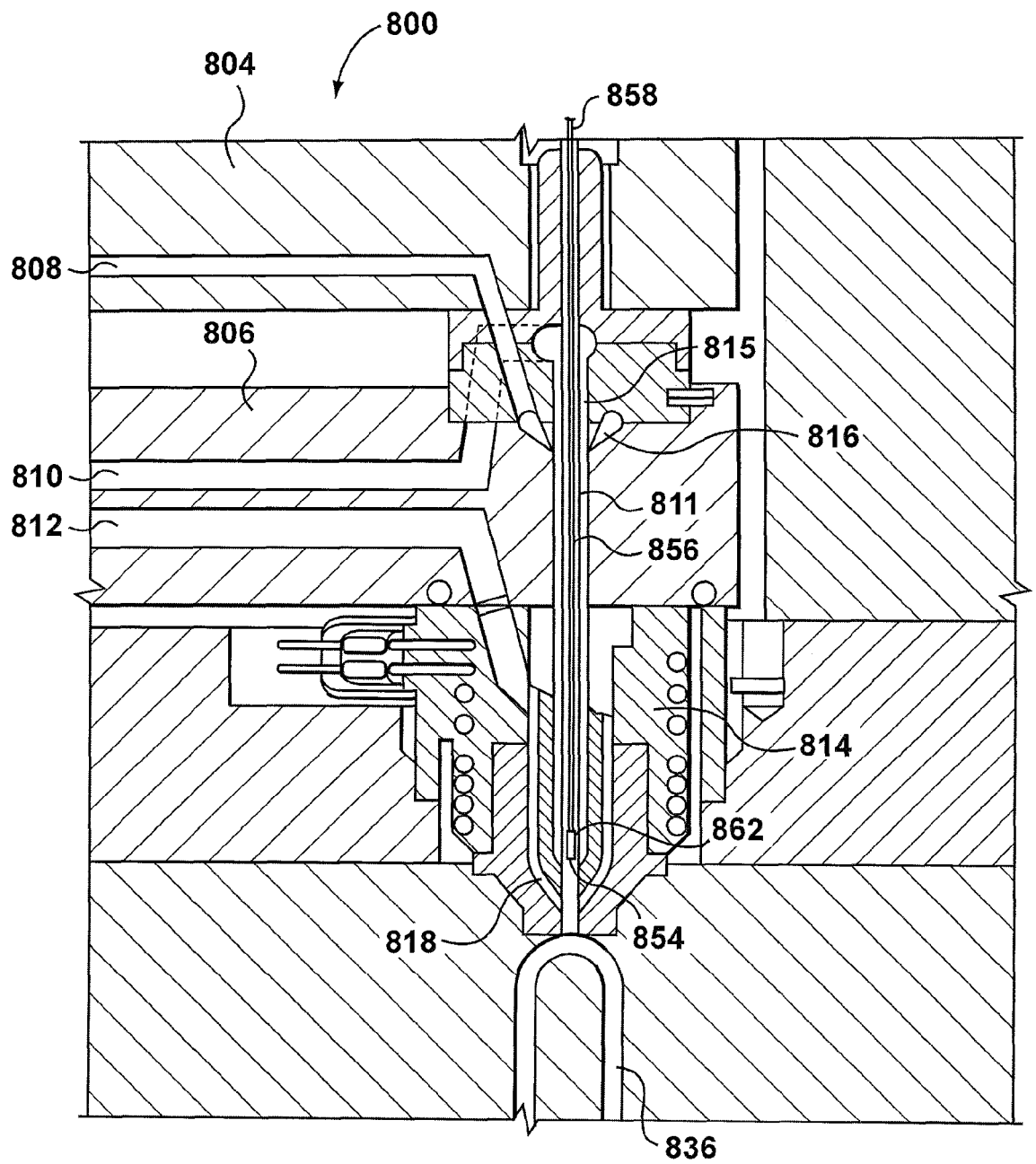

Reference is made to FIGS. 8A, 8B and 8C, which show a co-injection molding apparatus 800 with a co-injection nozzle 814. Valve pin 811, that is similar to valve pin 11 in FIGS. 1 and 2, is incorporated into the co-injection apparatus 800. Co-injection is the injection of different materials into a single mold cavity 836 to form, for example, a product having several layers. Some of the layers may be made from the same material, and some layers may be made from a different material. Some layers may flow into the mold cavity 836 simultaneously, while some layers may flow into the mold cavity 836 sequentially. Co-injection is used for many applications, such as preforms for soft drink bottles.

Molding apparatus 800 may include a plurality of manifolds, such as manifolds 804 and 806. Manifolds 804 and 806 receive melt from a plurality of melt sources (not shown), and may have a plurality of melt channels therein, which are shown at 808, 810 and 812. Each melt channel 808, 810 and 812 carries melt which forms a different layer of the final molded product.

Co-injection nozzle 814 includes a first nozzle melt channel 815, a second nozzle melt channel 816 and a third nozzle melt channel 818, which receive melt from manifold melt channels 808, 810 and 812 respectively. Such a configuration is described in WIPO Publ. No. WO 00/54954 (Gellert et al.) incorporated by reference in its entirety herein. Nozzle melt channel 815 is typically central along its length, while melt channel 816 is typically annular and may join with melt channel 815, so that a second layer of material may be introduced into melt channel 815. Melt channel 818 may also be annular and join melt channel 815 to introduce a third layer of material to melt channel 815.

In another embodiment of the present invention, the pressure sensor is embedded in an outer surface of the valve pin 11 instead of extending through an internal passage thereof. The pressure sensor is embedded in a manner that ensures that the outer surface of the valve pin remains smooth.

The actuator 38 has been described as being a hydraulic piston-type, and as a rack-and-pinion type. It will be appreciated by persons skilled in the art that alternatively, the actuator 38 may be an electric rotary actuator, or an electric linear actuator, which can be connected to the valve pin 11.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
   a manifold including a first manifold melt channel for delivering a first melt material and a second manifold melt channel for delivering a second melt material;
   an injection molding nozzle having a first melt channel for receiving the first melt material from the first manifold melt channel and having a second melt channel for receiving the second melt material from the second manifold melt channel;
   a valve pin having a valve pin body with a segment that slidably extends through the first melt channel of the nozzle, the valve pin being axially movable for controlling the flow of the first and second melt materials;

a processing sensor coupled to and positioned at least partially within the segment of the valve pin body that extends within the first melt channel; and a mold cavity in fluid communication with the nozzle via a respective mold gate, wherein the valve pin has a downstream end portion for selectively opening and closing the mold gate.

2. The injection molding apparatus of claim 1, wherein at a first axial position of the valve pin the processing sensor measures a pressure of the first melt material.

3. The injection molding apparatus of claim 2, wherein at a second axial position of the valve pin the processing sensor measures a pressure of the second melt material.

4. The injection molding apparatus of claim 1, wherein when the end portion of the valve pin is seated within the mold gate in the closed position the processing sensor measures a pressure of the melt material in the mold cavity.

5. The injection molding apparatus of claim 1, wherein said processing sensor is a thermocouple.

6. The injection molding apparatus of claim 5, wherein the thermocouple is positioned within the end portion of the valve pin.

7. The injection molding apparatus of claim 5, further comprising:
at least one thermocouple coupled to the nozzle.

8. The injection molding apparatus of claim 1, wherein said processing sensor is a pressure sensor.

9. The injection molding apparatus of claim 1, further comprising:
a controller for communicating with the processing sensor.

10. The injection molding apparatus of claim 1, wherein the processing sensor has a melt contacting surface that is flush with an end surface of the valve pin.

11. The injection molding apparatus of claim 1, wherein the processing sensor has a melt contacting surface that is downstream of an end surface of the valve pin.

12. The injection molding apparatus of claim 1, wherein the processing sensor includes a pressure sensor and a temperature sensor.

13. The injection molding apparatus of claim 1, wherein the manifold is comprised of a first manifold including the first manifold melt channel and a second manifold including the second manifold melt channel.

14. An injection molding apparatus comprising:
an injection molding nozzle having a first melt channel for receiving a first melt material from a first melt source and having a second melt channel for receiving a second melt material from a second melt source;

a valve pin having a body segment that slidably extends within the first melt channel of the nozzle, the body segment including a downstream end portion of the valve pin being axially movable for controlling the flow of the first and second melt materials;

a pressure sensor coupled to and disposed at least partially within the body segment of the valve pin; and a mold cavity in fluid communication with the nozzle via a respective mold gate, wherein the valve pin end portion is selectively positionable for opening and closing the mold gate.

15. The injection molding apparatus of claim 14, wherein at a first axial position of the valve pin within the first melt channel the pressure sensor measures a pressure of the first melt material.

16. The injection molding apparatus of claim 15, wherein at a second axial position of the valve pin within the first melt channel the pressure sensor measures a pressure of the second melt material.

17. The injection molding apparatus of claim 14, wherein when the end portion of the valve pin is seated within the mold gate in the closed position the pressure sensor measures a pressure of the melt material in the mold cavity.

18. The injection molding apparatus of claim 14, further comprising:
at least one thermocouple coupled to the valve pin and axially movable therewith.

19. The injection molding apparatus of claim 18, further comprising:
at least one thermocouple coupled to the nozzle.

20. The injection molding apparatus of claim 14, further comprising:
at least one thermocouple coupled to the nozzle.

21. The injection molding apparatus of claim 14, further comprising:
a controller for communicating with the pressure sensor.

22. The injection molding apparatus of claim 14, wherein the second melt channel is annular and is radially displaced from the first melt channel.

23. The injection molding apparatus of claim 14, wherein the pressure sensor is at least partially embedded within the end portion of the valve pin.

24. The injection molding apparatus of claim 14, wherein the pressure sensor is embedded within the end portion of the valve pin such that a melt contacting surface of the pressure senor is flush with a downstream end surface of the valve pin.

25. The injection molding apparatus of claim 8, wherein the pressure sensor is positioned within the end portion of the valve pin.

* * * * *